US010572759B2

(12) United States Patent
Liu

(10) Patent No.: US 10,572,759 B2
(45) Date of Patent: Feb. 25, 2020

(54) IMAGE PROCESSING DEVICE, IMAGE PROCESSING METHOD, AND PROGRAM

(71) Applicant: Rakuten, Inc., Tokyo (JP)

(72) Inventor: Rong Liu, Tokyo (JP)

(73) Assignee: Rakuten, Inc., Tokyo (JP)

( * ) Notice: Subject to any disclaimer, the term of this patent is extended or adjusted under 35 U.S.C. 154(b) by 75 days.

(21) Appl. No.: 15/742,024

(22) PCT Filed: Jul. 5, 2016

(86) PCT No.: PCT/JP2016/069884
§ 371 (c)(1),
(2) Date: Jan. 4, 2018

(87) PCT Pub. No.: WO2017/010351
PCT Pub. Date: Jan. 19, 2017

(65) Prior Publication Data
US 2018/0189589 A1  Jul. 5, 2018

(30) Foreign Application Priority Data

Jul. 10, 2015  (WO) .................. PCT/JP2015/069955

(51) Int. Cl.
G06K 9/32 (2006.01)
G06K 9/20 (2006.01)
G06K 9/46 (2006.01)

(52) U.S. Cl.
CPC .......... G06K 9/325 (2013.01); G06K 9/2054 (2013.01); G06K 9/2081 (2013.01);
(Continued)

(58) Field of Classification Search
CPC ............... G06K 9/2054; G06K 9/2063; G06K 2009/2045; G06K 9/2081; G06K 9/325;
(Continued)

(56) References Cited

U.S. PATENT DOCUMENTS 5,920,655 A   7/1999 Makita et al.
2001/0041005 A1* 11/2001 Fujiwara ............ G06K 9/00456
382/181

(Continued)

FOREIGN PATENT DOCUMENTS

JP   H05-40849 A   2/1993
JP   H08-221513 A  8/1996
(Continued)

OTHER PUBLICATIONS

English translation of the International Search Report for PCT/JP2016/069884.
(Continued)

Primary Examiner — Dwayne D Bost
Assistant Examiner — Stephen M Brinich
(74) Attorney, Agent, or Firm — HEA Law PLLC

(57) ABSTRACT

To quickly specify a region of a character group included in an image, image obtaining means of an image processing device obtains the image data. Expansion means expands and unites a plurality of regions respectively indicating objects included in an image indicated by the image data obtained by the image obtaining means. Character region determining means determines whether all or some of the regions, which are expanded and united by the expansion means, are character regions. Processing performing means performs predetermined processing on a region that is determined by the character region determining means as a character region.

10 Claims, 16 Drawing Sheets

(52) U.S. Cl.
CPC ........... *G06K 9/4604* (2013.01); *G06K 9/468* (2013.01); *G06K 2209/01* (2013.01); *G06K 2209/015* (2013.01)

(58) Field of Classification Search
CPC .. G06K 9/3241; G06K 9/3233; G06K 9/3258; G06K 9/3266; G06K 9/344; G06K 9/4604; G06K 9/46; G06K 9/4609; G06K 9/468
USPC ................ 382/173, 176–182, 197–200, 229, 382/289–292, 301
See application file for complete search history.

(56) References Cited

U.S. PATENT DOCUMENTS

| | | |
|---|---|---|
| 2005/0180645 A1 | 8/2005 | Hasegawa et al. |
| 2005/0232484 A1 | 10/2005 | Tagawa et al. |
| 2010/0053707 A1* | 3/2010 | Mori .................. H04N 1/40062 358/505 |
| 2012/0093414 A1* | 4/2012 | Choi .................. G06K 9/00234 382/173 |
| 2012/0148101 A1* | 6/2012 | Yoon ..................... G06K 9/325 382/103 |

FOREIGN PATENT DOCUMENTS

| | | |
|---|---|---|
| JP | 2000-181931 A | 6/2000 |
| JP | 2001-143074 A | 5/2001 |
| JP | 2002-165079 A | 6/2002 |
| JP | 2005-328348 A | 11/2005 |

OTHER PUBLICATIONS

English translation of the International Search Report for PCT/JP2015/069955.
Office Action dated Sep. 24, 2019, for corresponding CA Patent Application No. 2,991,106.

* cited by examiner

IMAGE PROCESSING DEVICE, IMAGE PROCESSING METHOD, AND PROGRAM

CROSS REFERENCE TO RELATED APPLICATIONS

This application is a National Stage of International Application No. PCT/JP2016/069884 filed on Jul. 5, 2016, which claims priority from International Application No. PCT/JP2015/069955, filed on Jul. 10, 2015. The contents of the above document is incorporated herein by reference in its entirety.

TECHNICAL FIELD

The present invention relates to an image processing device, an image processing method, and a program.

BACKGROUND ART

There are known techniques for separately performing character recognition on each character in a character group in an image, such as optical character recognition (OCR). For example, Patent Literature 1 describes techniques for repeatedly scanning a binarized image vertically and horizontally, extracting a region between white lines where there is no black pixel, and determining whether each region includes a character.

CITATION LIST

Patent Literature

Patent Literature 1: JPH05-40849A

SUMMARY OF INVENTION

Technical Problem

However, in conventional techniques, for example, even in a case where it is desired to specify character groups in an image as one group, a region of each character in the character groups is extracted and character recognition is separately performed for each region using the OCR. As such, it takes time to specify the regions of the character groups in the image.

One or more embodiments of the present invention have been conceived in view of the above, and an object thereof is to quickly specify a region of a character group included in an image.

Solution to Problem

In order to solve the above described problems, an image processing device according to the present invention includes image obtaining means for obtaining image data stored in means for storing the image data, expansion means for expanding and uniting a plurality of regions respectively indicating objects included in an image indicated by the image data obtained by the image obtaining means, character region determining means for determining whether all or some of the regions, which are expanded and united by the expansion means, are character regions, and processing performing means for performing predetermined processing on a region that is determined by the character region determining means as a character region.

An image processing method according to the present invention includes an image obtaining step of obtaining image data stored in means for storing the image data, an expansion step of expanding and uniting a plurality of regions respectively indicating objects included in an image indicated by the image data obtained in the image obtaining step, a character region determining step of determining whether all or some of the regions, which are expanded and united in the expansion step, are character regions, and a processing performing step of performing predetermined processing on a region that is determined in the character region determining step as a character region.

A program according to the present invention causes a computer to function as image obtaining means for obtaining image data stored in means for storing the image data, expansion means for expanding and uniting a plurality of regions respectively indicating objects included in an image indicated by the image data obtained by the image obtaining means, character region determining means for determining whether all or some of the regions, which are expanded and united by the expansion means, are character regions, and processing performing means for performing predetermined processing on a region that is determined by the character region determining means as a character region.

An information storage medium according to the present invention is a computer-readable information storage medium that stores the program.

In an aspect of the present invention, the image processing device includes union restricting means for, in a case where a size of a contour of a region indicating an object included in the image or a size of the region itself is equal to or greater than a reference size, restricting the region from uniting with the region expanded by the expansion means.

In an aspect of the present invention, in the case where the size of the contour of the region indicating the object included in the image or the size of the region itself is equal to or greater than the reference size, the union restricting means fills the region with a background color so as to restrict the region from uniting with the region expanded by the expansion means.

In an aspect of the present invention, the image processing device according further includes determination restricting means for restricting the region expanded by the expansion means from being determined by the character region determining means in a case where a size of a contour of the region or a size of the region itself is equal to or greater than the reference size.

In an aspect of the present invention, in the case where the size of the contour of the region, which is expanded by the expansion means, or the size of the region itself is equal to or greater than the reference size, the determination restricting means fills the region with the background color so as to restrict the region from being determined by the character region determining means.

In an aspect of the present invention, the image processing device according further includes specifying operation receiving means for receiving specifying operation of some of the regions expanded and united by the expansion means. The character region determining means determines whether the some of the regions specified by the specifying operation received by the specifying operation receiving means are character regions.

In an aspect of the present invention, the processing performing means expands an inside of the region that is determined by the character region determining means as a character, and displays the expanded inside of the region on the display means on which the image is displayed.

Advantageous Effects of Invention

According to the present invention, it is possible to promptly specify a region of a character group included in an image.

DESCRIPTION OF EMBODIMENTS

[1. Hardware Configuration of Electronic Book Display Device]

Figure 1:
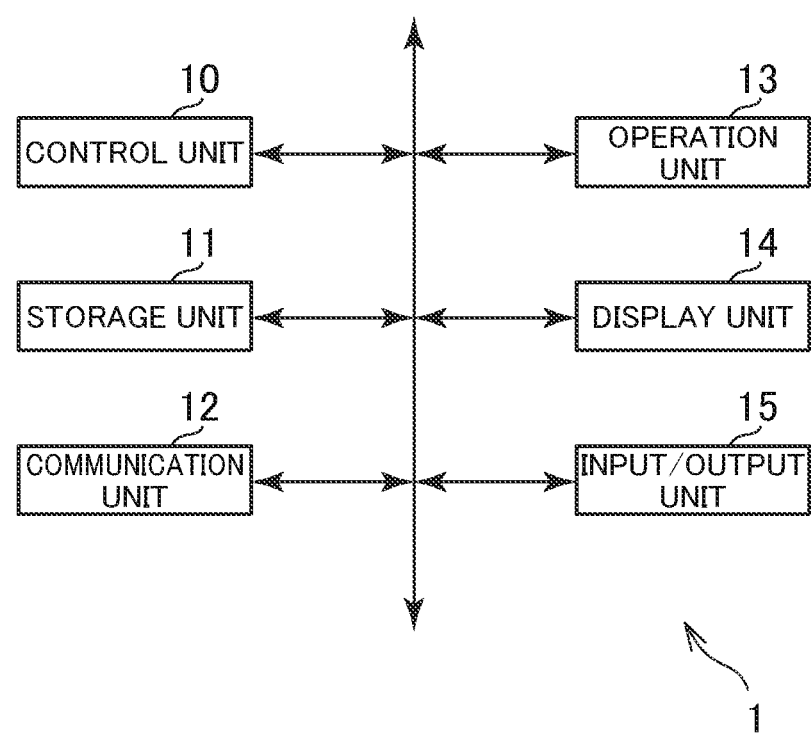
FIG. 1 is a diagram illustrating hardware configuration of an electronic book display device in this embodiment.

Embodiments of the present invention will be described below in detail with reference to the accompanying drawings. FIG. 1 is a diagram illustrating hardware configuration of an electronic book display device (an example of an image processing device) in this embodiment. The electronic book display device 1 is a computer operated by a user, such as a mobile phone (including smartphone), a mobile information terminal (including tablet computer), an electronic book reader, and a personal computer. As shown in FIG. 1, the electronic book display device 1 includes a control unit 10, a storage unit 11, a communication unit 12, an operation unit 13, a display unit 14, and an input/output unit 15.

The control unit 10 includes, for example, one or more microprocessors. The control unit 10 executes processing according to a program or data stored in the storage unit 11. The storage unit 11 includes a main storage unit and an auxiliary storage unit. For example, the main storage unit is a RAM, and the auxiliary storage unit is a hard dish drive or a solid state drive. The communication unit 12 is a communication interface, such as a network card.

The operation unit 13 is a general input device including a touch panel or a pointing device, such as a mouse. The operation unit 13 sends an operation of a user to the control unit 10. The display unit 14 is, for example, a liquid crystal display unit or an organic EL display unit. The display unit 14 displays a screen according to an instruction from the control unit 10. The input/output unit 15 is an input/output interface for inputting/outputting data to/from external devices. For example, the input/output unit 15 reads data and programs from a computer-readable information storage medium (e.g., optical disc and memory card).

The programs and the data, which are described as being stored in the storage unit 11, may be supplied to the storage unit 11 from a server computer connected to the network through the communication unit 12, or from an information storage medium through the input/output unit 15. The hardware configuration of the electronic book display device 1 is not to be limited to the above described example, and various types of computer hardware may be applicable.

[2. Functions Implemented in Electronic Book Display Device]

Figure 2:
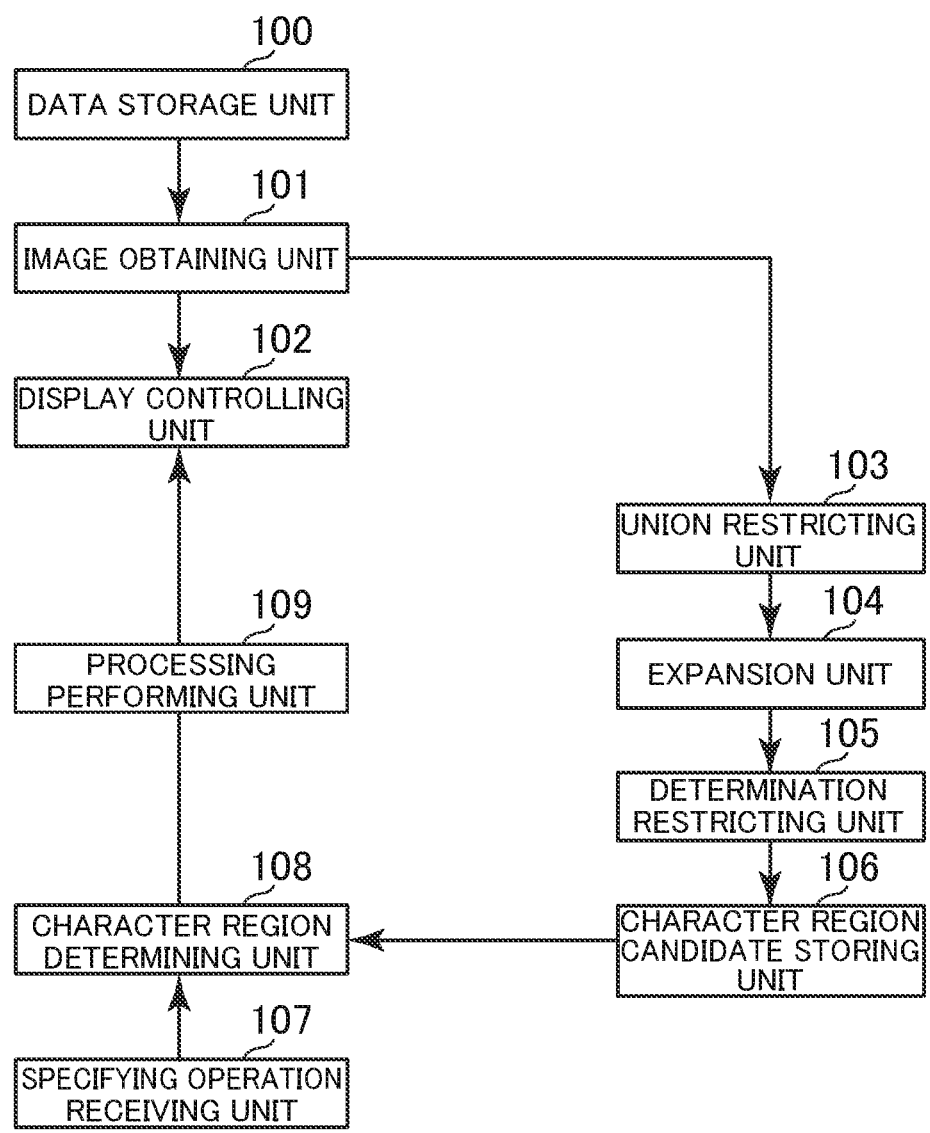
FIG. 2 is a functional block diagram illustrating an example of functions implemented in the electronic book display device.

FIG. 2 is a functional block diagram illustrating an example of functions implemented in the electronic book display device 1. As shown in FIG. 2, the electronic book display device 1 implements a data storage unit 100, an image obtaining unit 101, a display controlling unit 102, an union restricting unit 103, an expansion unit 104, a determination restricting unit 105, a character region candidate storing unit 106, a specifying operation receiving unit 107, a character region determining unit 108, and a processing performing unit 109. The data, storage unit 100 is implemented mainly by the storage unit 11, and other functions are implemented mainly by the control unit 10.

[1.2-1. Data Storage Unit]

The data storage unit 100 stores various types of data regarding images of electronic books, for example. The data storage unit 100 stores, for example, image data of images of electronic books. The electronic book may be any book electronically displayed on the display unit 14, for example, comics, picture books, and magazines. The electronic book at least includes characters. Other than characters, the electronic book may include, for example, pictures, photographs, and graphics. Here, the pictures are not limited to be drawings that are drawn by human hand and read by a scanner to be digitized, but also include CG drawn by human using a computer. The data format of the image data may be a data format used in electronic books in general.

The electronic book may be configured of a plurality of pages, or of a single page. In a case where the electronic book is configured of a plurality of pages, each page may have image data, or there may be collective image data in which all pages are put together. The electronic book may be in color, monochrome, or grayscale. In this embodiment, comics of multiple pages represented in gray-scale will be described as an example of the electronic book.

The data storage unit 100 may store data other than the image data. For example, the data storage unit 100 may include additional data attached to the image data. The additional data is, for example, a page number of each page. Alternatively, the data storage unit 100 may store an application of electronic book reader (viewer application). For example, the data storage unit 100 may store learning data for character determination described later.

[2-2. Image Obtaining Unit]

The image obtaining unit 101 obtains image data stored in the data storage unit 100 that stores the image data. In a case where the electronic book includes multiple pages as in this embodiment, the image obtaining unit 101 may obtain image data of all of the pages at a time, or obtain image data of only some of pages. In a case where the image obtaining unit 101 obtains the image data of only some of the pages, the image obtaining unit 101 may obtain only image data of a page to be displayed, or obtain image data of the page to be displayed and preceding and succeeding pages. The page to be displayed may be one page, or a plurality of pages, such as opposing pages. Further, in a case where the electronic book is comics as in this embodiment, only one frame in one page may be a display target. In this embodiment, a case will be described in which one of the pages is a display target.

[2-3. Display Controlling Unit]

Figure 3:
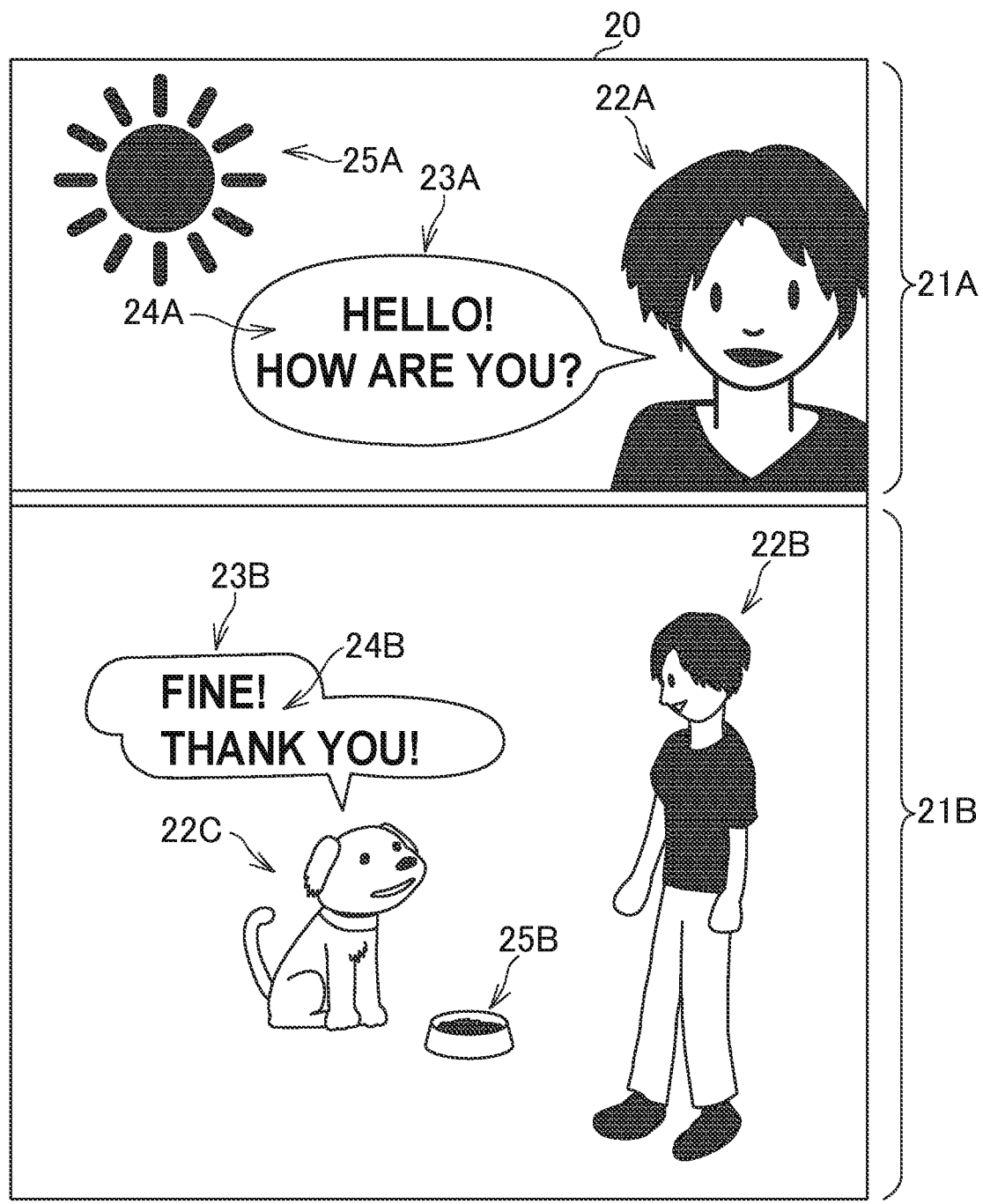
FIG. 3 is a diagram illustrating an example of an electronic book image.

The display controlling unit 102 displays an electronic book image on the display unit 14 based on the image data obtained by the image obtaining unit 101. FIG. 3 is a diagram illustrating an example of the electronic book image. In this embodiment, comics including multiple pages is taken as an example of the electronic book, and thus, as shown in FIG. 3, an electronic book image 20 is each page of the comics. The electronic book image 20 includes one or more frames 21. The frame 21 is a section in a page in which a picture and a character are depicted. In the example of FIG. 3, the electronic book image 20 includes two frames 21 (also described as frames 21A and 21B). In the example of FIG. 3, each frame 21 is enclosed, although each frame 21 may not be enclosed.

Each frame 21 includes objects such as pictures, balloons, and characters. The balloon indicates words of a character in the comics. The character is a person in the comics, and may be an animal, a robot, or a virtual creature other than human beings. The balloon includes one or more characters indicating words of the character. In the following, a group of characters will be described as a character group, in the example of FIG. 3, the frame 21A includes a character 22A, a balloon 23A, a character group 24A, and a sun 25A, and the frame 21B includes characters 22B and 22C, a balloon 23B, a character group 24B, and a dish 25B. The characters 22A to 22C, the sun 25A, and the dish 25B are examples of the pictures described above. The balloon 23A indicates the words of the character 22A, and the balloon 23B indicates the words of the character 22C.

In a case where the display target is one page as in this embodiment, the display controlling unit 102 may display the entire page as shown in FIG. 3, or only a part of the page. When a part of the page is displayed, the display controlling unit 102 displays the part specified by a user using the operation unit 13.

[2-4. Union Restricting Unit]

When a size of a contour of a region, indicative of an object included in the electronic book image 20 or the region itself is equal to or more than a reference size, the union restricting unit 103 restricts the region from uniting with a region, expanded by the expansion unit 104 described later. For example, when the character group 24A expands and unites with the balloon 23A, the character group 24A cannot be detected as a cluster of characters. As such, the union restricting unit 103 prevents such a union in a way as described below, thereby increasing accuracy of the detection of the character group 24A.

In this embodiment, for simplicity, a case will, be described in which the union restricting unit 103, the expansion unit 104, the determination restricting unit 105, and the character region candidate storing unit 106 perform image processing on the electronic book image 20 displayed on the display unit 14, although the image processing may be performed on the electronic book image 20 before being displayed on the display unit 14. In this case, image processing may be performed on electronic book images 20 of the preceding and succeeding pages to the page displayed on the display unit 14.

The region is a part (pixel) in the electronic book image 20 where an object is depicted, and a part having a color (e.g., black or gray) other than a background color (e.g., white). For example, the parts were objects, such as the characters 22A to 22C, the balloons 23A and 23B, the character groups 24A and 24B, the sun 25A, and the dish 25B, are depicted correspond to the regions in this embodiment. The object is an object depicted in the electronic book image 20 other than in the background part.

The contour is a frame of the region, and in this embodiment, something represented by the electronic book display device 1 as a line is described as a contour line. The region is also described as a part inside a contour, or a part between contours. For example, in a case of the character group 24A, the inside of the contour of the character "L" is a region, and a part of the character "O" between the outer contour and the inner contour is a region.

The size of a contour may be represented by, for example, the width, length, or inner size of the contour. In this embodiment, a size of a bounding rectangle of the contour is used as a size of the contour. The size of a region may be, for example, the width of the region. In this embodiment, the size of the bounding rectangle of the region is used as the size of the region.

Figure 4:
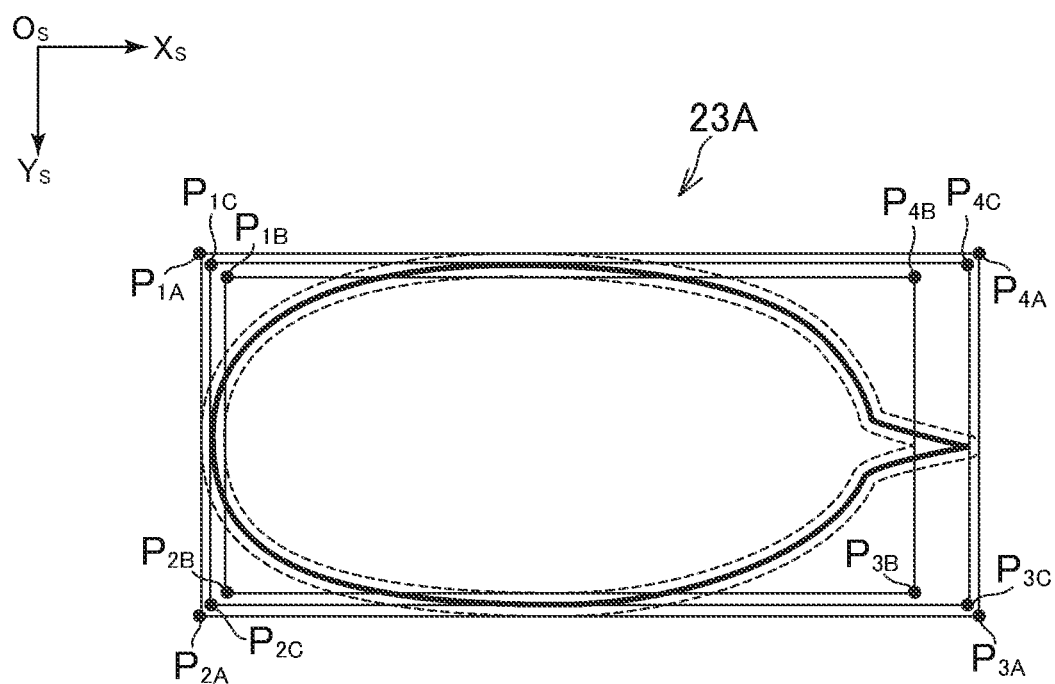
FIG. 4 is a diagram explaining a size of a region.

FIG. 4 is a diagram explaining sizes of a contour and a region. In FIG. 4, an Xs-axis and a Ys-axis are coordinate axes in a screen coordinate system. Here, the balloon 23A is taken as an example of the region to explain the size of the contour of the balloon 23A and the size of the balloon 23A itself. In FIG. 4, the outer contour line and the inner contour line of the balloon 23A are drawn by a dashed line, and the balloon 23A is drawn by a solid line. In FIG. 4, for convenience of explanation, there are gaps between the solid line and the dashed lines, although there is no gap between these lines.

For example, the bounding rectangle of the contour line is a region between the minimum and maximum values of the Xs coordinate, and also between the minimum and maximum values of the Ys coordinate of the contour line. In the example shown in FIG. 4, the bounding rectangle of the cater contour line is a rectangle having points $P_{1A}$ to $P_{4A}$ as vertexes, and thus the size or this rectangle corresponds to the size of the outer contour line. The bounding rectangle of the inner contour line is a rectangle having points $P_{1B}$ to $P_{4B}$ vertexes, and thus the size of this rectangle corresponds to the size of the inner contour line.

For example, the bounding rectangle of the balloon 23A is a region between the minimum and maximum values of the Xs coordinate, and also between the minimum and maximum values of the Ys coordinate of the pixels of the balloon 23A. The bounding rectangle of the balloon 23A is a rectangle having points $P_{1C}$ to $P_{4C}$ as vertexes, and thus the size of this rectangle corresponds to the size of the balloon 23A itself.

The union restricting unit 103 may use either one of the size of the contour and the size of the region. In this embodiment, a case will be explained in which the size of the contour is used. The union restricting unit 103 extracts a bounding rectangle of a contour of each of the regions in the electronic book image 20, and determines a size of each bounding rectangle is equal to or greater than the reference size. A value indicating the size may use at least one of a vertical width and a horizontal width of a bounding rectangle, or an area of a bounding rectangle. Alternatively, for example, a length of a diagonal line of a bounding rectangle may be used as a value indicating the size. In this embodiment, a case will be described in which both of a vertical width and a horizontal width of a bounding rectangle are used as values indicating the size.

A threshold value $T_1$ indicating a reference of a size may be a fixed value, or a variable value. If the threshold value $T_1$ is a fixed value, the data storage unit 100 stores such a value, and if the threshold value $T_1$ is a variable value, such a value is calculated based on the values stored in the data storage unit 100. In this embodiment, a case will be described in which the threshold value $T_1$ is a fixed value. For example, the union restricting unit 103 determines whether each of the vertical width and the horizontal width of the bounding rectangle is equal to or greater than the threshold value $T_1$, thereby determining whether a size of each contour is equal to or greater than the reference size.

In this embodiment, a case will be described in which, when a size of a contour of a region is equal to or greater than the reference size, the union restricting unit 103 fills the region with the background color, thereby restricting the region from uniting with a region expanded by the expansion unit 104 described below. The background color is a predetermined color specified for an image, and, for example, a color that occupies a largest part of the image. For example, the background color is white or black. In this embodiment, union means that a region is in contact with or overlaps another region to make one region.

For example, since the contour of the balloon 23A is relatively large, the anion restricting unit 103 determines the contour of the balloon 23A has the size equal to or greater than the reference size, and fills the balloon 23A with the background color. This enables to prevent the balloon 23A from uniting with the character group 24A expanded by the expansion unit 104 described later. Specifically, in this embodiment, the union restricting unit 103 fills the regions such as the balloon 23A by executing (1) binarization reversal processing, (2) contour extracting processing, (3) contour line expanding processing, and (4) expanded contour line superimposing processing, as described below.

[Binarization Reversal Processing]

Figure 5:
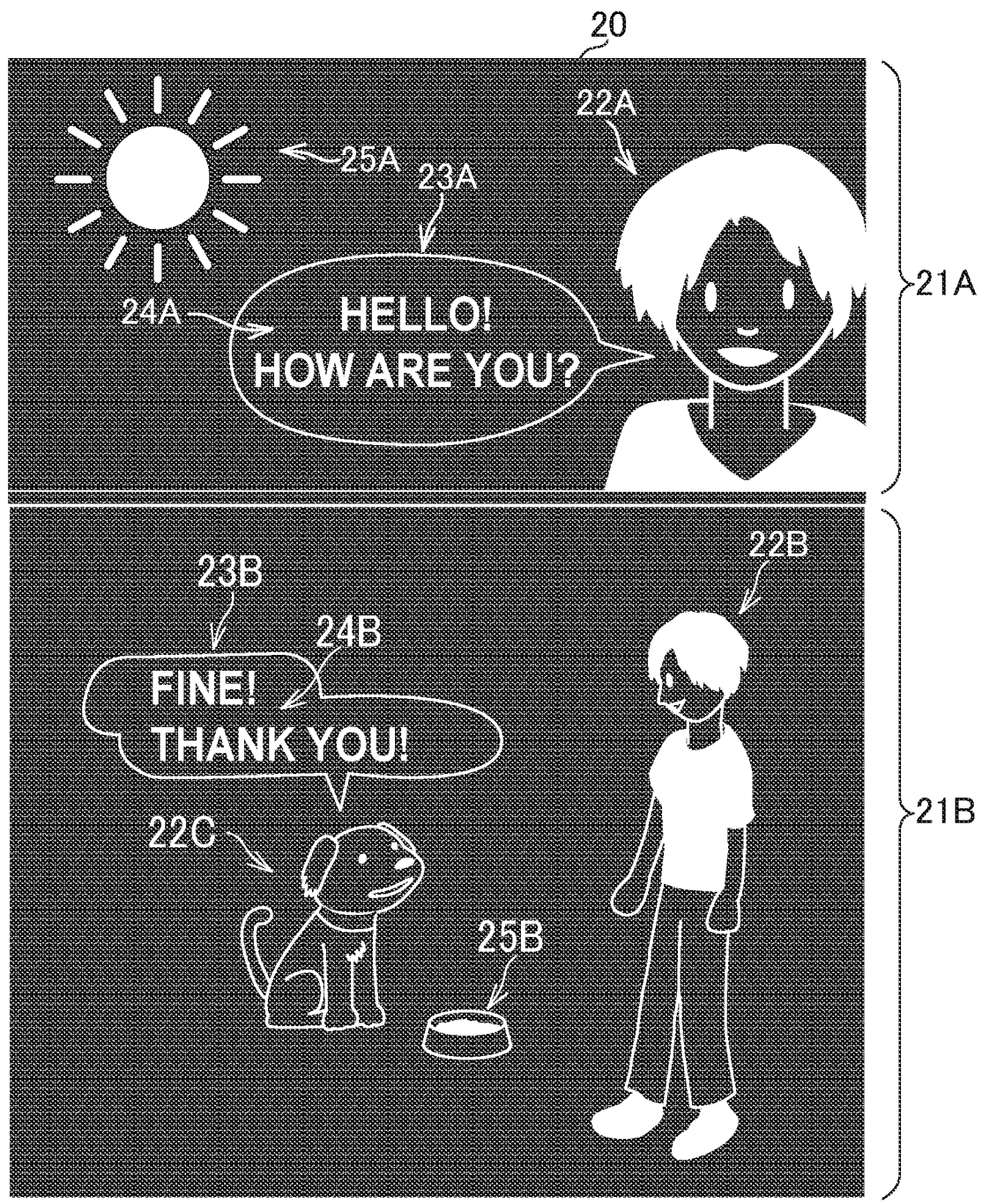
FIG. 5 is a diagram, illustrating a binarized and reversed electronic book image.

First, the union restricting unit 103 performs binarization processing and reversal processing on the electronic book image 20. FIG. 5 is a diagram illustrating the binarized and reversed electronic book image 20. The union restricting unit 103 performs the binarization processing based on pixel values of respective pixels of the electronic book image 20 shown in FIG. 3 and threshold values, and sets each pixel to white or black. Various known algorithms may be used for the binarization processing. For example, a threshold value may be determined by using the P-tile method or the mode method. The union restricting unit 103 reverses pixel values of the respective binarized pixels, and sets the white pixels to black and the black pixels to white. This sets the electronic book image 20 shown in FIG. 4 to the condition shown in FIG. 5. Various known algorithms may be also used for the reversal processing. For example, the pixel values after reversal may be calculated by subtracting a current value of the pixel value from the maximum value (255 in the case of 8-bit gray scale) of the pixel values of the respective colors.

[Contour Extracting Processing]

Figure 6:
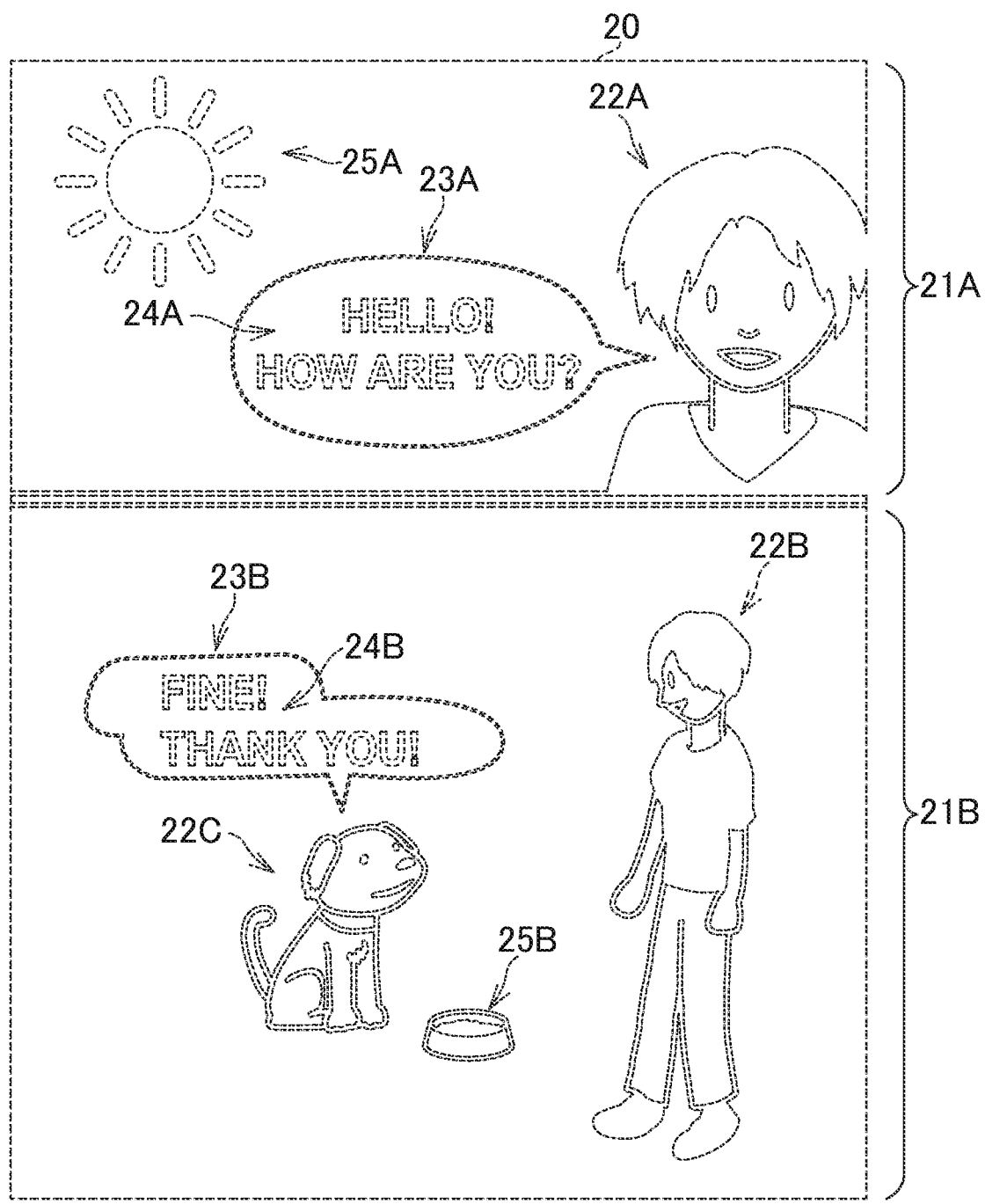
FIG. 6 is a diagram illustrating contour lines extracted from the electronic book image shown in FIG. 5.

The union restricting unit 103 performs contour extracting processing on the binarized and reversed page electronic book image 20 (FIG. 5), and extracts contours of closed regions. FIG. 6 is a diagram illustrating contour lines extracted from the electronic book image 20 shown in FIG. 5. In FIG. 6, the contour lines extracted by the union restricting unit 103 are shown in dashed lines. The contour line may be a line having a predetermined thickness (e.g., 1 pixel). Here, the contour line is black, but may have any predetermined color. Since the balloons 23A and 23B are drawn in white in the binarized and reversed electronic book image 20 (FIG. 5), the balloons 23A and 23B need to be filled in black, which is the background color.

Various known contour extraction algorithms may be also used for the contour extracting processing. For example, a contour of each region may be extracted by detecting edges in the image using a differential filter, a Prewitt filter, or a Sobel filter. In the electronic book image 20 shown in FIG. 5, the left side of the head and the left shoulder of the character 22A are in contact with the contour of the frame 21A, and thus, as shown in FIG. 6, contour lines of the character 22A and the contour lines of the frame 21A are chained together.

[Contour Line Expanding Processing]

The union restricting unit 103 expands a contour line extracted by the contour extracting processing and having a size of the reference size or more. The union restricting unit 103 extracts the bounding rectangles of the respective contour lines, and determines whether a size of each of the bounding rectangles is equal to or greater than the threshold value $T_1$. As described above, in this embodiment, the vertical width and the horizontal width of the bounding rectangle are used as a size. As such, the union restricting unit 103 determines whether the vertical width and the horizontal width of the bounding rectangle each are equal to or greater than the threshold value $T_1$, thereby determining whether a size of each contour line has the reference size or more.

The union restricting unit 103 expands the contour line of the reference size or more. To expand the contour line is to thicken the contour line. The extent to which the contour line is expanded (the number of pixels to thicken the line) may be a fixed value or a variable value. If it is a fixed value, the data storage unit 100 stores such a value, and if it is a variable value, such a value is calculated based on the values stored in the data storage unit 100. For example, the union restricting unit 103 may calculate the extent of expansion of a contour line based on the position and the size of the contour line. In this case, when a contour line is positioned closer to the center of the image, the probability that such a contour line is a contour line of the balloon 23A or the balloon 23B is high. As such, the extent of expansion of the contour line may be increased so as to fill in the region more surely. Further, for example, when a contour line is larger, the probability that such a contour line is a contour line of the balloon 23A or the balloon 23B is high. As such, the extent of expansion of the contour line may be increased so as to fill in the region more surely. In this embodiment, a case will be described in which the extent of expansion is a fixed value, and a line is thickened by predetermined pixels.

Figure 7:
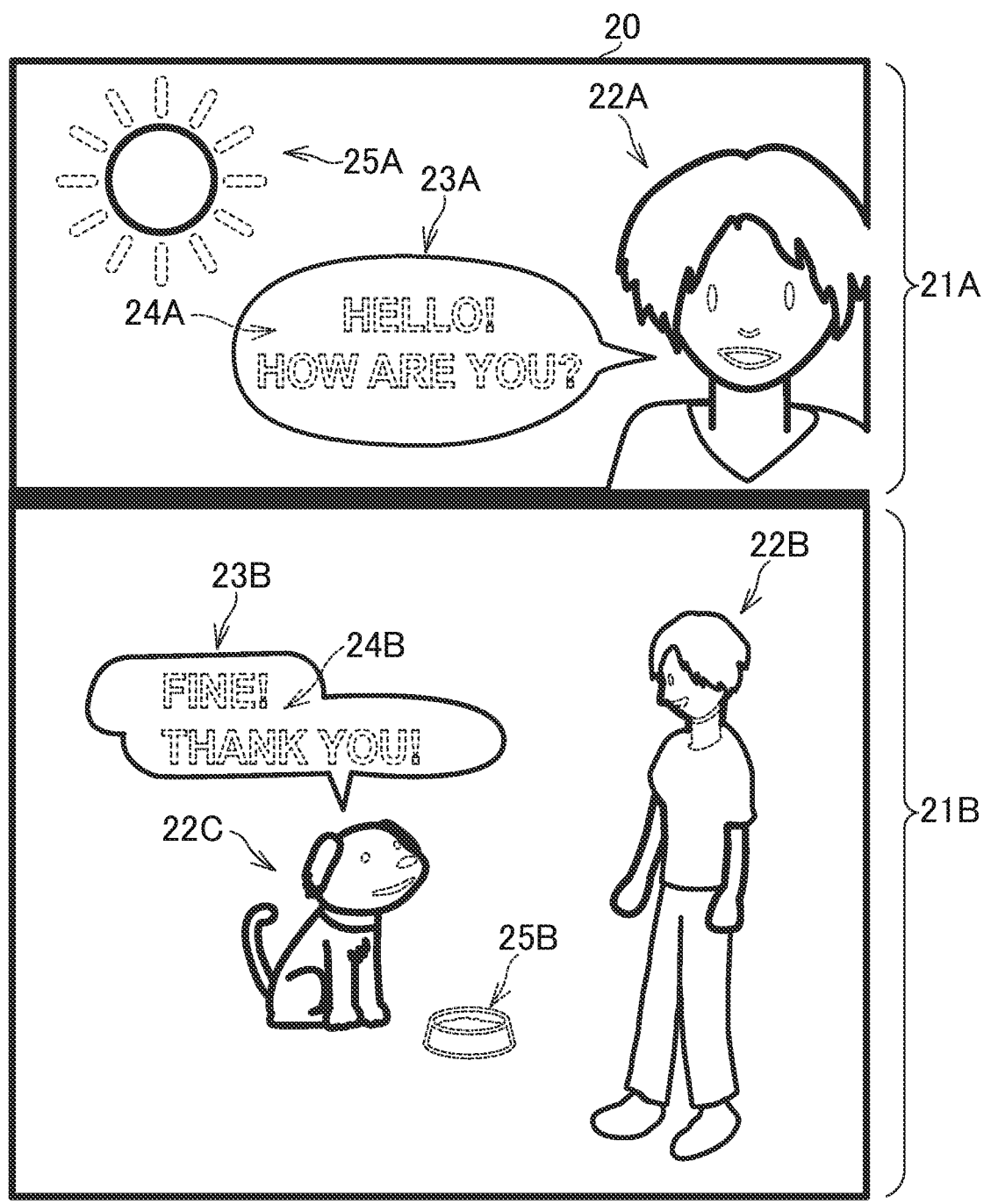
FIG. 7 is a diagram illustrating a condition of each contour line when a contour line having a reference size or more is expanded.

FIG. 7 is a diagram illustrating a condition of each contour line when a contour line having the reference size or more is expanded. In the example shown in FIG. 7, the contour lines of the frames 21A and 21B, the contour line of some parts of the characters 22A to 22C, the contour lines of the balloons 23A and 238, and the contour lines of a part of the sun 25A are thickened by predetermined pixels. As shown in FIG. 7, when the union restricting unit 103 expands a contour line, sometimes nearby contour lines are united with each other and make a thick contour line. For example, in the example shown in FIG. 7, the outer contour lines and the inner contour lines of the balloons 23A and 23B are expanded respectively, and unite to each other to make one thick contour line.

[Expanded Contour Line Superimposing Processing]

Figure 8:
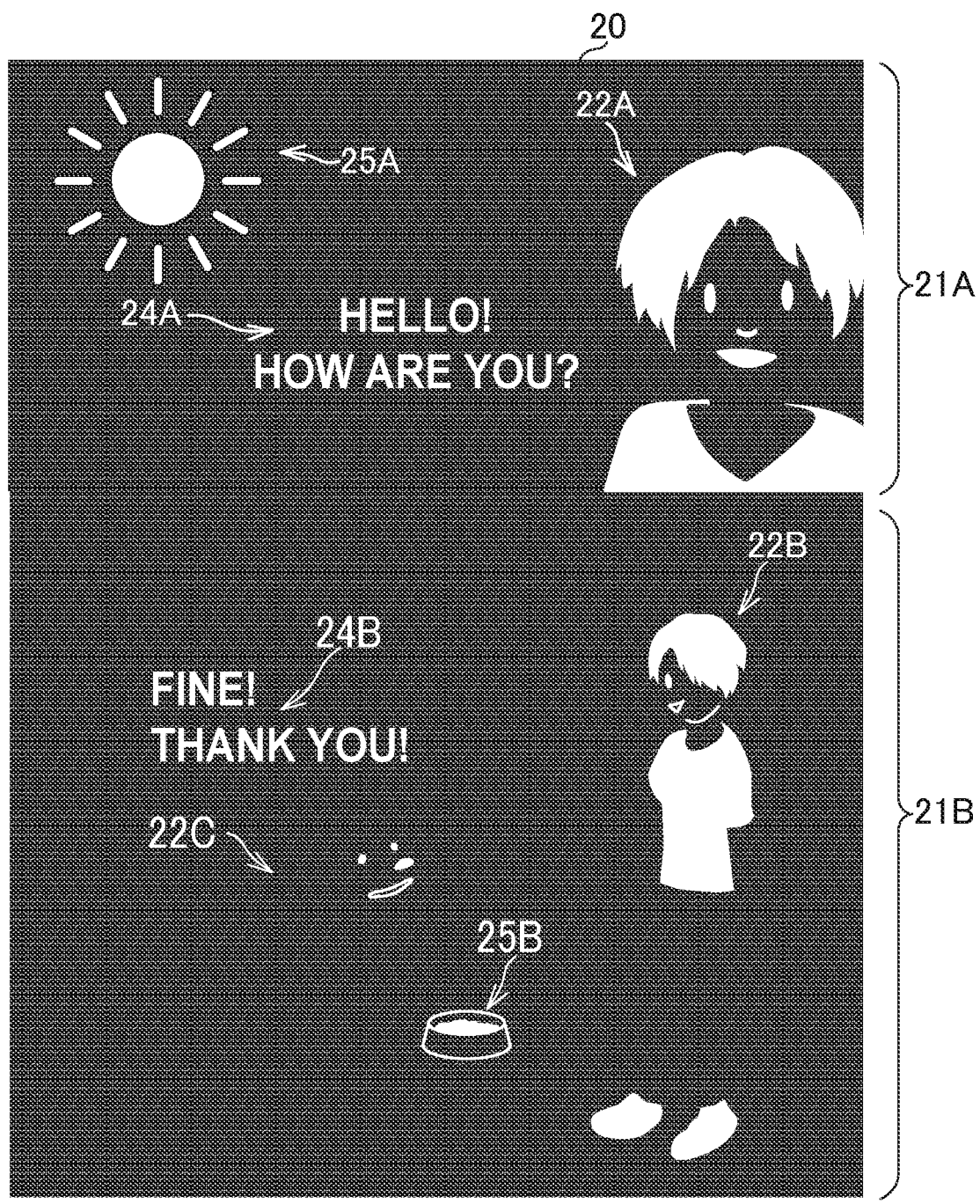
FIG. 8 is a diagram, illustrating the electronic book image on which expanded contour lines are superimposed.

The union restricting unit 103 superimposes the expanded contour lines (FIG. 7) on the binarized and reversed electronic book image 20 (FIG. 5). FIG. 8 is a diagram illustrating the electronic book image 20 on which the expanded contour lines are superimposed. As shown in FIG. 8, the expanded contour lines forming a thick line is superimposed on each of the balloons 23A and 23B, and thus the balloons 23A and 23B are filled with black. As such, by the processing described later, even if the expansion unit 103 expands the character groups 24A and 24B, the character groups 24A and 34B do not unite with the balloons 23A and 23B.

The balloons 23A and 23B are filled with the background color as described above. The method for filling the balloons 23A and 23B with the background color is not limited to the above described method. For example, the union restricting unit 103 may select a region (e.g., balloons 23A and 23B) between the contour lines having the reference size or more, and perform the reversal processing of colors again only on the selected range. In this manner, for example, the color of balloons 23A and 23B shown in FIG. 5 return to black, from white, and thus the balloons 23A and 23B can be filled with black. Alternatively, for example, the union restricting unit 103 may fill a region between the contour lines having the reference size or more where a distance between the contour lines is less than a predetermined distance with background color. Further, for example, the union restricting unit 103 may fill, with the background color, a section in which regions surrounded by the contour lines continue for a predetermined distance or more. When the above described conditions are added to the regions on which the union restricting unit 103 performs processing, the probability that the regions specified by the conditions are the parts where lines are drawn, such as the balloons 23A and 23B, is high. As such, it is possible to more surely fill the lines such as the balloons 23A and 23B and prevent the balloons 23A and 23B from uniting with the character groups 24A and 24B.

For example, the method for preventing the balloons 23A and 23B from uniting with the character groups 24A and 24B is not limited to the method for filling the balloons 23A and 23B with the background color. For example, the union restricting unit 103 may store positions of the regions having the reference size or more (positions of pixels forming the regions) in the data storage unit 100, and, even if a region expanded by the expansion unit 104 described later is included in the pixels, not determine that such pixels are included in the regions having the reference sire or more. In order not to determine that such pixels are included in the regions having the reference size or more, for example, the regions may not have the same number in the labeling processing to extract, the same regions. Alternatively, for example, the union restricting unit 103 may prevent the expansion unit 104 from expanding a region in a direction of a contour line having the reference size or more. In this manner as well, for example, the character groups 24A and 24B do not expand in the direction of the balloons 23A and 23B, and thus it is possible to prevent the balloons 23A and 23B from combining with the character groups 24A and 24B.

[2-5. Expansion Unit]

The expansion unit 104 expands each of the regions indicative of objects included in the electronic book image 20 indicated by the image data obtained by the image obtaining unit 101, and unites the expanded regions. The expansion unit 104 may expand all of the regions in the electronic book image 20 shown in FIG. 8, or not expand the region extracted by the union restricting unit 103 and having the contour of the reference size or more but expand the region having the contour of less than the reference size. That is, for example, the expansion unit 104 may expand only a region having a contour of less than the reference size, such as eyes, noses, and mouths of the characters 22A, 22B, and 22C, characters in the character groups 24A and 24B, a part of the sun 25A, and the dish 25B.

To expand the region means to thicken the region, and to widen an area occupied by the region. The extent of expansion of the region may be a fixed value, or a variable value. If it is a fixed value, the data storage unit 100 stores such a value, and if it is a variable value, such a value is calculated based on the values stored in the data storage unit 100. For example, the expansion unit 104 may calculate the extent of expansion of a region based on the position and the size of the region in the image. In this case, when the region positioned closer to the center of the image, the probability that the region is characters is increased. As such, the extent of expansion of the region may be increased so as to unite the region with other characters more surely. Further, when a distance between a region and another region is shorter, the probability that the region is one of characters in a character group is increased. As such, the extent of expansion of the region may be increased so as to unite the region with other characters more surely. Further, for example, when a size of a region is within a predetermined range (an area large enough to be assumed as a character), the probability that the region is a character is increased. As such, the extent of expansion of the region may be increased so as to unite the region with other characters more surely. In this embodiment, a case will be described in which the extent of expansion is a fixed value, and a region is thickened by predetermined pixels.

Figure 9:
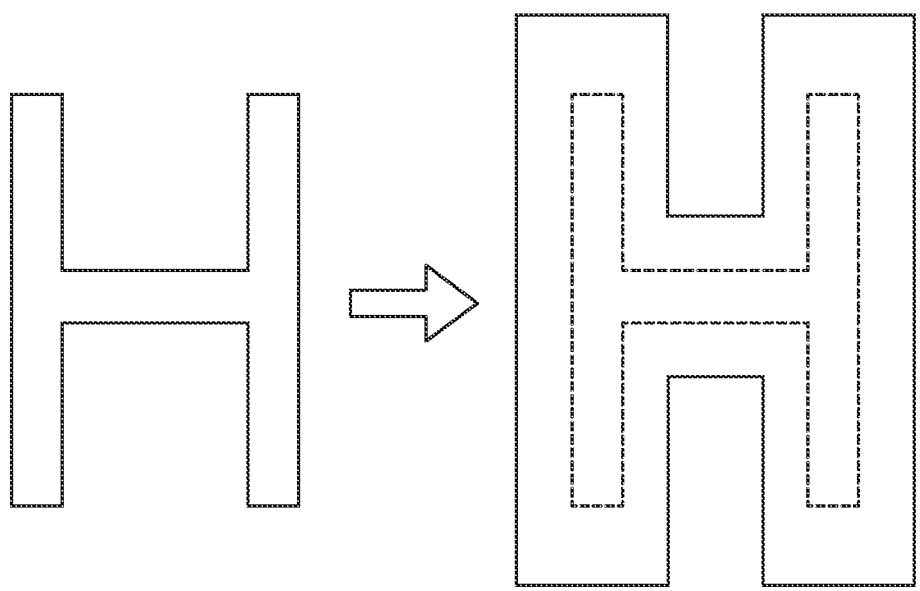
FIG. 9 is a diagram explaining processing of an expansion unit.
Figure 10:
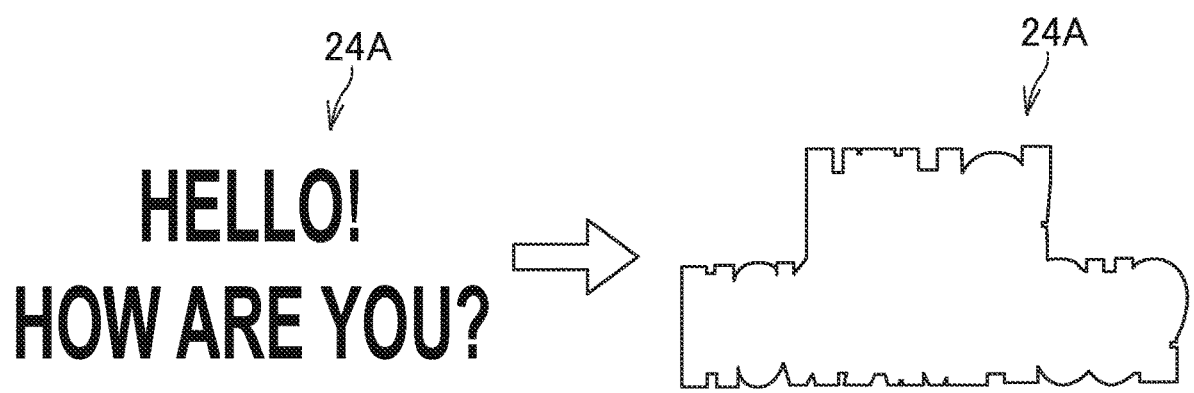
FIG. 10 is a diagram explaining processing of the expansion unit.

FIGS. 9 and 10 are diagrams explaining the processing of the expansion unit 104. Here, a case will be taken as an example in which the expansion unit 104 expands each character in the character group 24A. For example, as shown in FIG. 9, the expansion unit 104 expands "H" by predetermined pixels. In other words, the expansion unit 104 fills pixels in a predetermined distance from "H" (i.e., pixels surrounding "H") with white. The expansion unit 104 also expands characters other than "H" in "HELLO!HOW ARE YOU?" of the character group 24A in the same way as "H" by the predetermined pixels. When the expansion unit 104 expands each character in the character group 24A, as shown in FIG. 10, the characters in the character group 24A are united to make one region.

Figure 11:
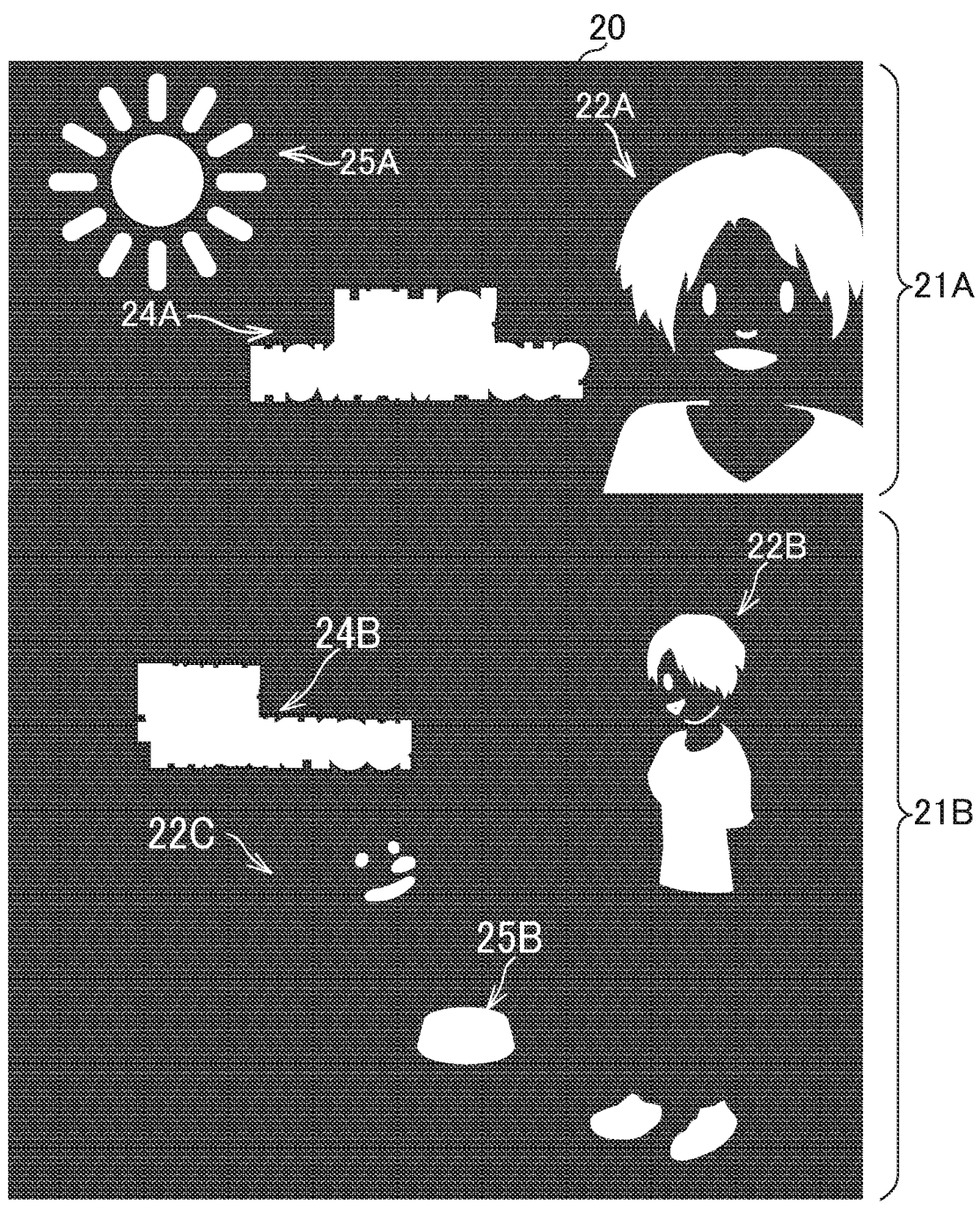
FIG. 11 is a diagram illustrating a condition after regions are expanded by the expansion unit.

FIG. 11 is a diagram illustrating a condition after the regions are expanded by the expansion unit 104. As shown in FIG. 11, here, the regions of the characters included in the character groups 24A and 24B are expanded and united, and each make one region. In addition, for example, regions in the dish 25B are expanded and united together. Other regions are expanded but not united because there is no neighboring region.

[2-6. Determination Restricting Unit]

If a contour of a region (FIG. 12) or the region itself expanded by the expansion unit 104 has a size less than the reference size, the determination restricting unit 105 restricts the region from being determined by the character region determining unit 108. In the description of the determination restricting unit 105, a case will be described in which a size of a contour is used in the same way as in the union restricting unit 103.

The threshold value indicating the reference size may be smaller than the threshold value $T_1$. Similarly to the threshold value $T_1$, the threshold value $T_2$ may be a fixed value or a variable value. In this embodiment, a vertical width and a horizontal width of a bounding rectangle are used as a size. As such, the determination restricting unit 105 determines whether the vertical width and the horizontal width of the bounding rectangle are equal to or greater than the threshold value $T_2$, thereby determining whether the contour of the region expanded by the expansion unit 104 is less than the reference size.

Figure 12:
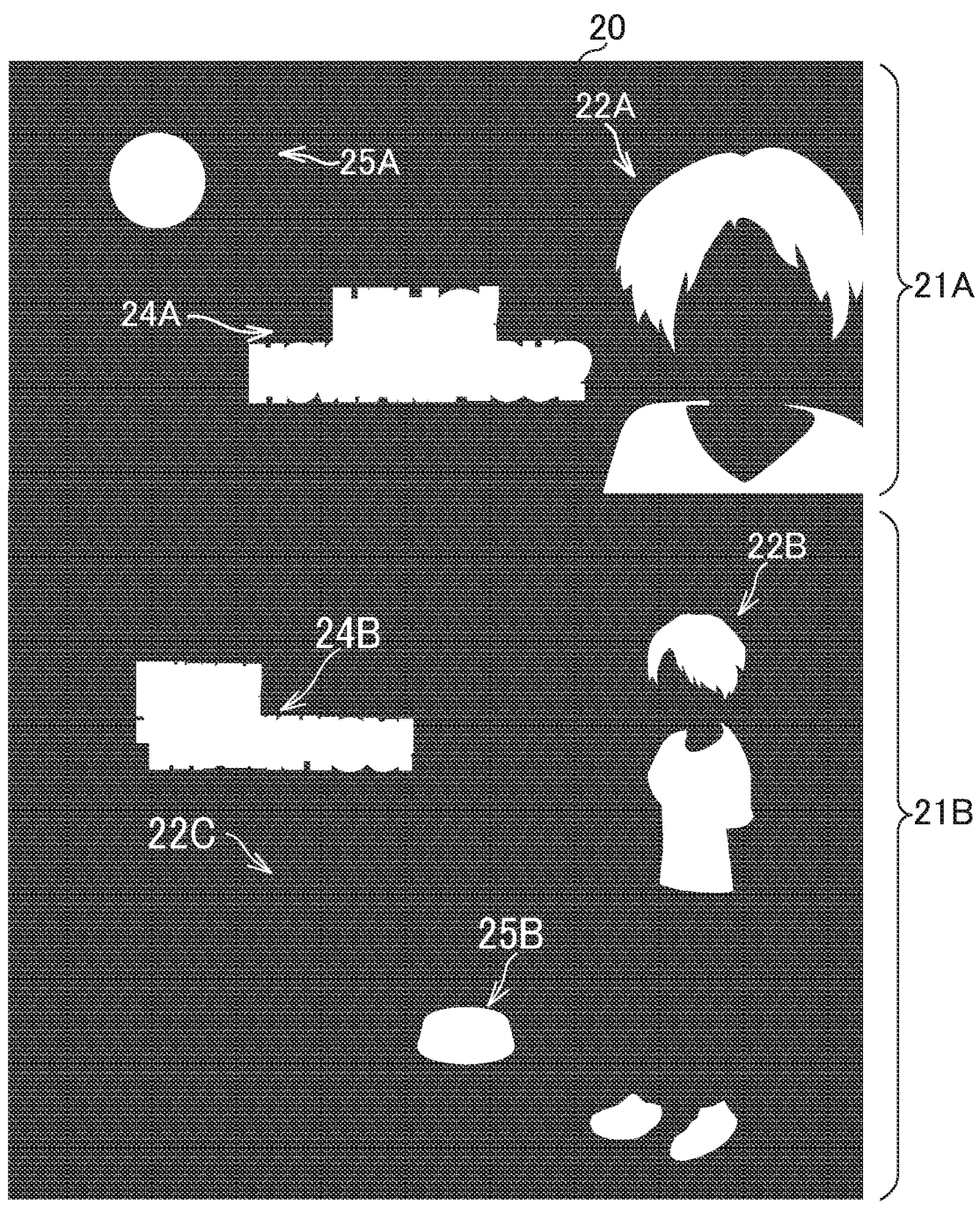
FIG. 12 is a diagram illustrating a page after regions having contours less than a reference size are filled with a background color.

In this embodiment, a case will be discussed in which, if a size of a contour of a region expanded by the expansion unit 104 is less than the reference size, the determination restricting unit 105 fills the region with the background color, thereby restricting the region to be determined by the character region determining unit 108. FIG. 12 is a diagram illustrating the page after the regions having the contours less than the reference size are filled with the background color. For example, since the contours of eyes, noses, and mouths of the characters 22A and 22C and a part of the sun 25A are less than the reference size, the determination restricting unit 105 fills these regions with black as shown in FIG. 12.

A region may be restricted by the character region determining unit 108 from being a target of character determination by a method other than filling the region less than the reference size with the background color. For example, the determination restricting unit 105 may store a position of a region less than the reference size in the data storage unit 100 so as to prevent the character region determining unit 108 from performing the determination processing even if a user specifies the region.

[2-7. Character Region Candidate Storing Unit]

The character region candidate storing unit 106 stores, in the data storage unit 100, data indicative of character region candidates in the electronic book image 20. The character region candidate is a region to be determined by the character region determining unit 108. In other words, the character region candidate is a region in which a character is likely included. In this embodiment, the character region candidate is a region of white pixels in the electronic book image 20 (FIG. 12) on which processing of the determination restricting unit 105 has been performed.

Figure 13:
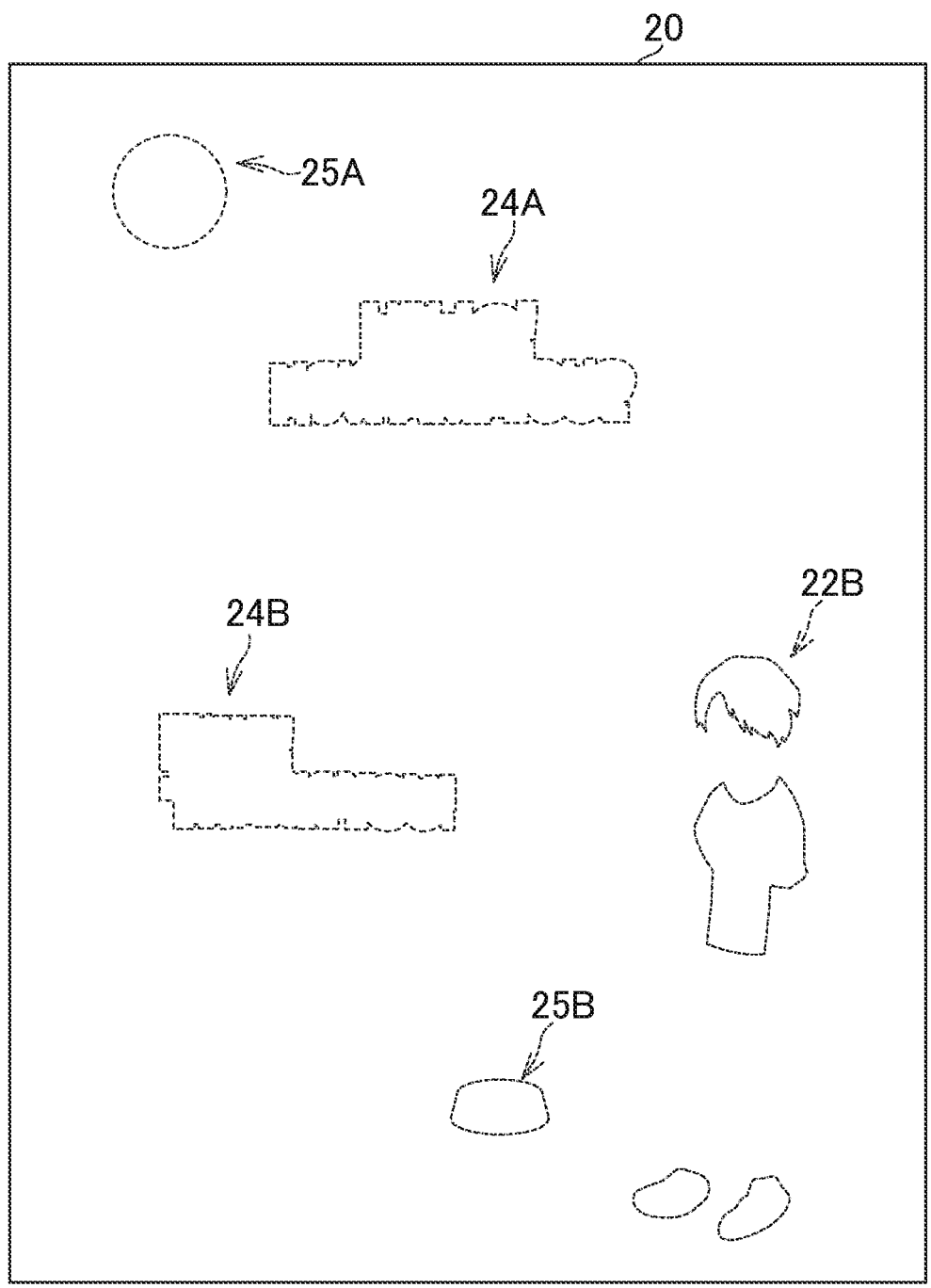
FIG. 13 is a diagram illustrating an example of a character region candidate in the electronic book image.

FIG. 13 is a diagram illustrating an example of the character region candidate. The character region candidate storing unit 106 performs the contour extracting processing on the electronic book image 20 shown in FIG. 12 so as to extract contours (shown in dashed lines in FIG. 13) of regions of white pixels. The contour extracting processing may be the same as the processing by the union restricting unit 103. Here, the character region candidate storing unit 106 extracts the contours of the closed regions, and thus does not extract the contours of the character 22A shown in FIG. 12. The character region candidate storing unit 106 stores data indicating a position of the extracted contour line in the data storage unit 100.

Here, the data indicating the position of the contour line is taken as an example of data for identifying the character region candidate, although any data that can identify a character region candidate may be used. For example, the character region candidate storing unit 106 may perform the labeling processing on the electronic book image 20 shown in FIG. 12 and give the same number to the successive white pixels, thereby storing the data for identifying the character region candidate.

[2-8. Specifying Operation Receiving Unit]

The specifying operation receiving unit 107 receives specifying operation of some of the regions expanded and united by the expansion unit 104. The specifying operation may be operation to specify a region in the electronic book image 20, for example, operation to specify a position in the electronic book image 20. In this embodiment, operation performed by the operation unit 13 to specify a position in a display screen of the display unit 14 corresponds to the specifying operation. A region including the position specified by the operation unit 13 is thus specified by the specifying operation. In this embodiment, it can be said that the specifying operation is operation to specify one of the character region candidates.

[2-9. Character Region Determining Unit]

The character region determining unit 108 determines whether all or some of the regions expanded and united by the expansion unit 104 are character regions. The character region is a region including one or more characters in an image. For example, the character region determining unit 108 may determine all or some of the character region candidates stored by the character region candidate storing unit 106. For example, the character region determining unit 108 determines whether some of the regions specified by the specifying operation received by the specifying operation receiving unit are character regions. In this embodiment, the specifying operation receiving unit receives the specification of the character region candidate, and thus the character region determining unit 100 determines whether a character is included in the character region candidate. In this embodiment, a case will be described in which the character region determining unit 108 performs the determination processing by using the electronic book image 20 shown in FIG. 3, although the electronic book image 20 as shown in FIG. 5 or FIG. 8 may be used if the method of character region determination is changed according to a condition of an image to be used.

For example, the learning data of character patterns may be stored in the data storage unit 100, and the character region determining unit 108 may compare the character region candidate with the character pattern indicated by the learning data, thereby determining whether the character region candidate is a character region. The learning data defines a plurality of determining items, and, for example, whether the character region candidate is a character region is determined by the determining items described below.

Figure 14:
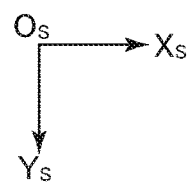
FIG. 14 is a diagram for explaining character region determination processing using learning data.
Figure 14:
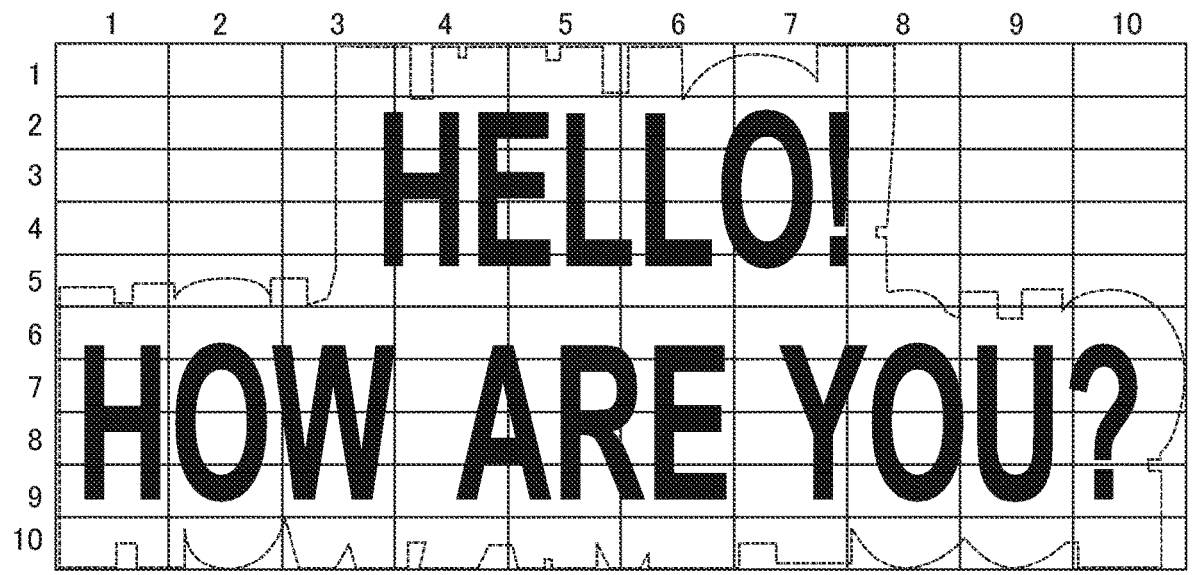

FIG. 14 is a diagram for explaining character region determination processing using the learning data. The character region determining unit 108 determines, as a first determining item, whether a size of the entire character region candidate is equal to or greater than the reference size. The size of the character region, candidate may use a size of the bounding rectangle, or may be obtained by counting the number of pixels in the character region candidate. Here, a case will be described in which the bounding rectangle is used. The threshold value $T_3$ indicating the reference size may be the same as or different from the threshold values $T_1$ and $T_2$. Further, similarly to the threshold values $T_1$ and $T_2$, the threshold value $T_3$ may be a fixed value or a variable value. If the size of the bounding rectangle is the reference size or more, the character region determining unit 108 acknowledges a character region.

As shown in FIG. 14, the character region determining unit 108 divides the bounding rectangle into rectangle regions of n squares×m squares (n and m are each an integer of 2 or more, here n=m=10). The character region determining unit 108 determines each of vertical lines (first to tenth columns in FIG. 14) and horizontal lines (first to tenth rows in FIG. 14) of the rectangle regions for the second determining item to the fifth determining item. The determination processing may be performed on all of the squares, or only on some of the squares (e.g., squares other than some of the outer squares).

The character region determining unit 108 determines, as the second determining item, whether the number of white pixels in each line is the reference value or more. The reference value may be a fixed value or a variable value. If the number of white pixels is the reference value or more, the character region determining unit 108 acknowledges a character region. As a third determining item, the character region determining unit 108 scans pixels in the respective lines from the ends, counts the number of white pixels that are converted into black pixels, and determines whether the counted number is a reference value or more. The reference value may also be a fixed value or a variable value. If the counted number is the reference value or more, the character region determining unit 108 acknowledges a character region.

As a fourth determining item, the character region determining unit 108 scans pixels in the respective lines from the ends, and determines whether a position at which the first white pixel is found is located at a predetermined position. For example, if a position at which the first white pixel is found is located within a reference distance from the end, the character region determining unit 108 acknowledges a character region. As a fifth determining item, the character region determining unit 108 scans pixels in the respective lines from the ends, and determines whether a position at which the last white pixel is found is located at a predetermined position. For example, if a position at which the last white pixel is found is located within a reference distance from the end, the character region determining unit 108 acknowledges a character region.

When it is determined that all of the first determining item to the fifth determining item defined in the learning pattern are the character regions, the character, region determining unit 108 may determine that the character region candidate is a character region. Alternatively, when it is determined that a predetermined number or more (e.g., three or more) of determining items are the character regions, the character region candidate may be determined as the character region.

The method for determining the character region candidate does not always have to be done by the methods described above, but may be performed in various other ways. For example, the character region determining unit 108 may compare a shape pattern of a character with the character region candidate to calculate the similarity in order to identify the character region. Alternatively, for example, the character region may be determined by using support vector machine (SVM), which is a supervised learning method. In this method, when the learning data is prepared in advance and plural items are entered in a determination algorithm as parameters, the determination algorithm uses the entered parameters and the learning data to obtain an output whether the character region candidate is a character region. By using this method, a character region can be specified more surely even in an image such as comics in which various shapes of characters and pictures are included, for example.

[2-10. Processing Performing Unit]

Figure 15:
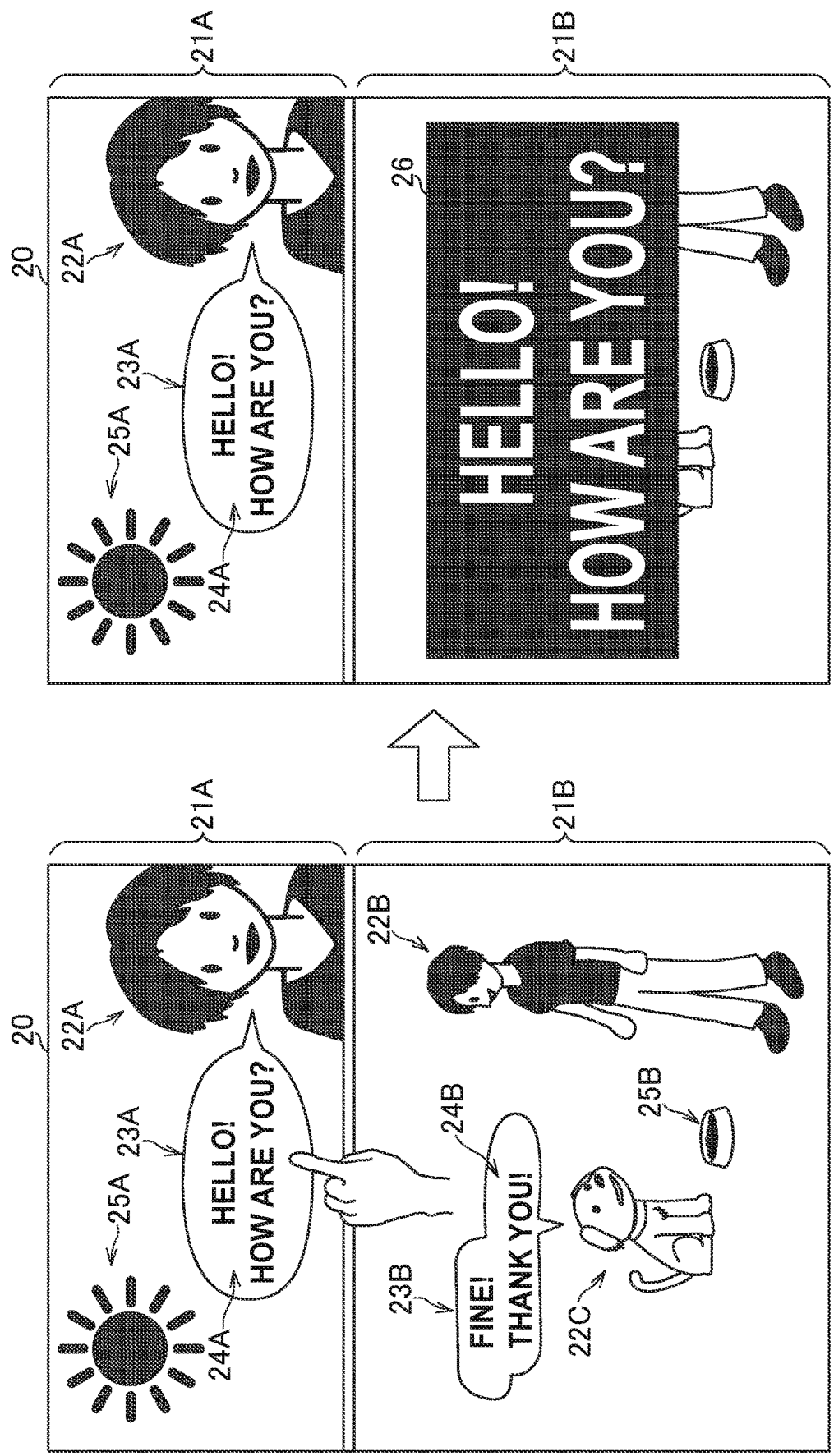
FIG. 15 is a diagram illustrating a character group in an enlarged display.

The processing performing unit 109 performs predetermined processing based on the region determined by the character region determining unit 108 as a character region. In this embodiment, as ah example of the predetermined processing, processing for expanding an image will be described. For example, on the display unit 14 on which the electronic book image 20 is displayed, the processing performing unit 109 expands the inside of the region determined by the character region determining unit 108 as a character region, and displays the expanded portion. FIG. 15 is a diagram illustrating the character group 24A in an enlarged display. As shown in FIG. 15, when a user specifies the character region candidate corresponding to the character group 24A, the character region determining unit 108 performs the character region determination processing. The processing performing unit 109 then displays an enlarged image 26 cut out from the character region candidate. In the example of FIG. 15, the processing performing unit 109 cuts out a portion in the character region candidate in the electronic book image 20 shown in FIG. 8 to expand and display the portion, and thus the characters in the enlarged image 26 are displayed with the colors reversed.

The processing performing unit 109 may cut out a portion in the character region candidate in the electronic book image 20 shown in FIG. 3 to expand and display the portion. In this case, the colors of the characters in the enlarged image 26 are not reversed. A range cut out as the enlarged image 26 is not limited to a rectangle as shown in FIG. 15, but may be any shape such as an oval. A position to display the enlarged image 26 may be randomly determined, or determined based on a position specified by a user. Further, an enlargement ratio of characters in the enlarged image 26 may be determined based on a size of the character region candidate, or may use a predetermined enlargement ratio.

[3. Processing Performed in Electronic Book Display Device]

Figure 16:
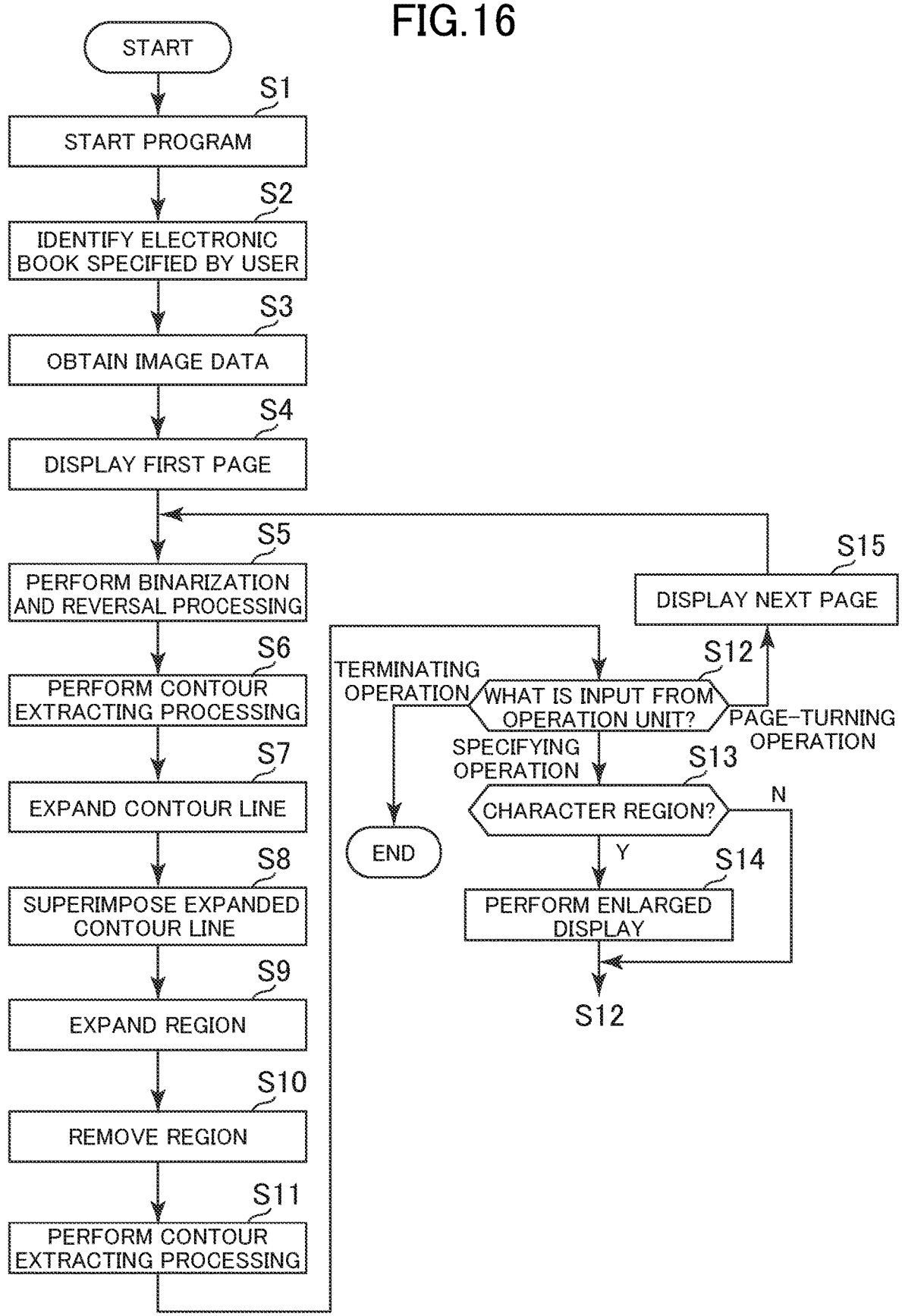
FIG. 16 is a flow chart showing an example of processing performed in the electronic book display device.

FIG. 16 is a flow chart showing an example of the processing performed in the electronic book display device 1. The processing shown in FIG. 16 is performed when the control unit 10 operates according to the program stored in the storage unit 11. In this embodiment, when the processing described below is performed, the functional block shown in FIG. 2 is implemented. For example, when a user uses the operation unit 13 to start the program, the following processing is performed.

As shown in FIG. 16, the control unit 10 starts the program stored in the storage unit 11 (S1), and identifies the electronic book specified by the user based on the input from the operation unit 13 (S2). For example, the program started in S1 is an application of an electronic book reader. In S1, the control unit 10 displays, on the display unit 14, a list of electronic books with image data stored in the storage unit 11. In S2, the control unit 10 identifies the electronic book specified by the user in the list.

The control unit 10 refers to the storage unit 11 and obtains the image data of the electronic book specified by the user (S3). The storage unit 11 stores identification information of electronic books owned by the user and image data in association with one another. The control unit 10 displays the first page of the electronic book on the display unit 14 based on the image data obtained in S3 (S4). In S4, the control unit 10 displays the electronic book image 20 (FIG. 3) indicated by the image data on the display unit 14.

The control unit 10 performs binarization processing and reversal processing on the electronic book image 20 (S5). As described above, a case is explained in which image processing of S5 to S11 is performed on the electronic book image 20 displayed on the display unit 14, although the image processing of S5 to S11 may be also performed in advance on electronic book images 20 on the preceding and succeeding pages to the electronic book image 20 displayed on the display unit 14. In S5, the control unit 10 generates data of the binarized and reversed electronic book image 20 (FIG. 5) and stores the data in the storage unit 11.

The control unit 10 performs contour extracting processing on the electronic book image 20 generated in S5 (S6). In S6, the control unit 10 generates data indicating contour lines (FIG. 6) in the electronic book image 20 and stores the data in the storage unit 11.

The control unit 10 expands a contour line of the reference size or more among the contour lines extracted in S6 (S7). In S7, the control unit 10 generates data indicating the expanded contour lines (FIG. 7) and stores the data in the storage unit 11. The control unit 10 may also update the data of the contour lines stored in the storage unit 11 in S6 instead of newly generating the data.

The control unit 10 superimposes the contour line expanded in S42 on the electronic book image 20 generated in S5 (S8). In S8, the control unit 10 generates data indicating the superimposed electronic book image 20 (FIG. 8) and stores the data in the storage unit 11. The control unit 10 may also update the data of the electronic book image 20 stored in the storage unit 11 in S5 instead of newly generating the data.

The control unit 10 expands regions in the electronic book image 20 on which the contour lines are superimposed in S8 (S9). In S9, the control unit 10 generates data indicating the expanded electronic book image 20 (FIG. 11) and stores the data in the storage unit 11. The control unit 10 may also update the data of the electronic book image 20 stored in the storage unit 11 in S5 or S8 instead of newly generating the data.

The control unit 10 removes a region of less than the reference size among the regions expanded in the electronic book image 20 in S9 (S10). In S10, the control unit 10 stores the data of the electronic book image 20 (FIG. 12) in the storage unit 11 after the region less than the reference size is removed. The control unit 10 may also update the data of the electronic book image 20 stored in the storage unit 11 in S5, S8, or S9 instead of newly generating the data.

The control unit 10 performs the contour extracting processing on the electronic book image 20 after the region is removed in S10 (S11). The processing of S11 is the same as that of S6, and the contour extracted in S11 is the contour of a character region candidate. In S11, the control unit 10 generates data indicating the contour lines (FIG. 13) in the electronic book image 20 after the region is removed in S10, and stores the data in the storage unit 11.

The control unit 10 receives input from the operation unit 13 (S12). Here, the user may perform, one of the specifying operation of the character region candidate, the page-turning operation, and the terminating operation. If it is determined that the user performs the specifying operation of the character region candidate (S12; specifying operation), the control unit 10 determines whether a character is included in the specified character region candidate (S13). In S13, the control unit 10 determines whether a character is included in the character region candidate based on the learning data and the pixel values in the character region candidate.

If it is determined that a character is included in the character region candidate (S13; Y), the control unit 10 expands and displays a portion in the character region candidate specified by the specifying operation (S14). In S14, the control unit 10 cuts out a portion in the character region candidate in the electronic book image 20 shown in FIG. 8, and displays the portion in an enlarged view on the display unit 14.

If it is determined that the user performs the page-turning operation (S11; page-turning operation), the control unit 10 displays the subsequent page on the display unit 14 (S15), and returns to the processing of S5. In this regard, information about the page being displayed is stored in the storage unit 11. After the processing returns to S5, the image processing of S5 to S11 is performed on the subsequent page, and the character region candidate is extracted.

If it is determined that the user performs the terminating operation (S12; terminating operation), the processing terminates. The data stored in the storage unit 11 in S3 to S11 may be discarded when the processing terminates or when the display unit 14 no longer displays the corresponding page. Alternatively, for examples, the data may be discarded when a difference from the page being displayed on the display unit 14 becomes the reference value or more.

According to the electronic book display device 1 described above, characters in the character groups 24A and 24B are expanded and united to one another to make a cluster of characters in each of the character groups 24A and 24B, and then it is determined whether the region is a character region. As such, the regions of the character groups 24A and 24B included in the electronic book image 20 can be more quickly specified as compared to a case where character recognition is separately performed on each character and then the characters are united together as in the OCR. For example, in a case where the learning data is applied to the entire character region candidate, whether the region is a character region can be determined based on overall features of the character region candidate. As such, whether the region is a character region can be determined in simpler processing than the processing using the OCR. Further, when characters are determined separately, it may not be possible to specify whether a character and another character are related and belong to one character group. In this regard, the electronic book display device 1 can identify characters related to each other, such as the character groups 24A and 24B, as one character group. If a character region is dynamically identified when the electronic book is displayed, memory capacity can be effectively used as compared to a case where the storage unit 11 previously stores data indicating positions of respective character groups at the time the electronic book is bought, for example.

If the character groups 24A and 24B are expanded and united with the balloons 23A and 23B, the character group may not be recognized as a group. In this regard, the electronic book display device 1 prevents the balloons 23A and 23B from uniting with the character groups 24A and 24B, and thus the character group can be recognized as a group and accuracy to determine the character region can be increased. Further, the balloons 23A and 23B are removed as noise, and thus it is possible to prevent the balloons 23A and 23B from being also expanded in an enlarged display.

Further, the regions of the balloons 23A and 23B are filled with the background color, and thus it is possible to prevent the balloons 23A and 23B from uniting with the character groups 24A and 24B with relatively simple processing. This enables to reduce the processing load on the electronic book display device 1.

Further, a small region is eliminated from a target of character region determination, and thus noise can be surely removed and determination of character is not performed for a region in which a character is obviously not included. This eliminates the need for unnecessary processing. In addition, if a small region is not stored in the storage unit 11 and discarded, a memory region can be effectively used.

Further, a small region is filled with the background color and thus eliminated from a target of character region determination with relatively simple processing. This can reduce the processing load on the electronic book display device 1.

Further, the character region determination is performed on a character region candidate specified by the specifying operation, and not performed on a character region candidate that is not specified by the user. This eliminates the need for unnecessary character region determination (for example, the character region determination is not performed on a region that the user does not especially want to expand), and thereby reducing the processing load on the electronic book display device 1.

Further, the character region candidate determined as a character region is expanded for an enlarged display, and thus, it is possible to quickly expand and display the character group compared to a case in which characters are recognized one by one and are grouped in a cluster as in the OCR. Further, the characters are grouped in a cluster and the character region determination is performed on the entire region of the characters, and thus it is possible to expand and display the cluster of the characters by relatively simple processing as compared to a case where characters are recognized one by one and are grouped in a cluster and expanded as in the OCR.

[4. Variation]

The present invention is not to be limited to the above described embodiment, and can be changed as appropriate without departing from the spirit of the invention.

For example, text written in each frame 21 may represent not only spoken words of the characters, but also feelings of the characters or sound effects of the comics. Such text may be recognizable as a set of characters by the expansion unit 104 expanding the regions. In this embodiment, by way of example, the words in the comics are written in English, although any other language may be used if the character regions are recognized by the electronic book display device 1. Further, the case has been described in which the spoken words of the characters are written horizontally, although the spoken words may be written vertically. In this case, the learning pattern for horizontal writing and the learning pattern for vertical writing are prepared in the data storage unit 100, and if a character region candidate is determined as a character region in either one of the learning pattern for horizontal writing and the learning pattern for vertical writing, character region determining unit 108 determines the character region candidate as a character region.

For example, the binarization reversal processing performed by the union restricting unit 103 may be omitted. In the embodiment, by way of example, the characters are surrounded by the balloon, although the characters may not necessarily be surrounded by the balloon. In this case, the processing of the union restricting unit 103 may be omitted. The characters are written in predetermined fonts, or in handwriting. The characters in handwriting may be recognizable as a set of characters by the processing of the expansion unit 104. Further, the characters may be different in fonts, sizes, colors, and brightness for each balloon, frame, and page. Even if the fonts, sizes, colors, and brightness are different, the characters are recognizable as a set by expanding the regions in the image by the expansion unit 104.

For example, as an example of predetermined processing performed by the processing performing unit 109, the case has been described in which a character region candidate determined as a character region by the character region determining unit 108 is displayed in an enlarged view, although the processing performed on the character region candidate determined as a character region is not limited to image processing, such as an enlarged display. Alternatively, the electronic book display device 1 may translate the characters in the character region candidate determined as a character region, or output machine-generated speech. That is, the predetermined processing may be translation processing, or sound output processing. Further, the electronic book display device 1 may extract characters in the character region candidate determined as including a character using the OCR, and stores data of the extracted characters in the storage unit 11 so that the characters can be searched in the electronic book. That is, the predetermined processing may be character extracting processing or search processing. Further, the processing performing unit 109 may expand a display based on the data of the characters detected by the OCR instead of cutting out regions in the character region candidate determined as a character region for an enlarged display.

Further, in the embodiment, the case is explained in which the character region determining unit 108 determines whether a character region candidate is a character region based on a condition that the user performs specifying operation to specify the character region candidate. That is, the case has been explained in which the character region determining unit 108 waits for performing the determination processing of the character region until the user performs the specifying operation, although the determination processing may be performed at any timing, and the condition for performing the determination processing is not limited to the specifying operation. For example, the character region determining unit 108 may automatically perform the determination processing of a character region on all of the character region candidates without the user's specific operation.

For example, when the electronic book image 20 is displayed, the character region determining unit 108 may automatically determine whether a character region candidate is a character region. Further, for example, before the electronic book image 20 is displayed, the character region determining unit 108 may automatically determine whether the character region candidate is a character region. In other words, the character region determining unit 108 may determine a character region during a period of time from when the electronic book program is started to the time when the electronic book image 20 is displayed. For example, the character region determining unit 108 may determine a character region even when the electronic book program is not started. For example, the character region determining unit 108 may determine whether a character region candidate is a character region during a period of time from when the electronic book display device 10 downloads image data of the electronic book from a server, for example, to the time when the electronic book program is started. In this case, processing of the union restricting unit 103, the expansion unit 104, the determination, restricting unit 105, and the character region candidate storing unit 106 may be performed in advance to extract character region candidates.

Further, the image processing device according to the present invention may be applicable to devices other than the electronic book display device 10, and may be a device that does not display an image. The display controlling unit 102 may be omitted. For example, prior to selling the electronic book, the image processing device determines a character region in the electronic book image 20, and provides the user with data indicating the determined character region together with the image data of the electronic book. Alternatively, the image processing device may be implemented by a server computer. For example, when the image data of the electronic book is uploaded to the image processing device, the character region determining unit 108 may determine a character region. In this case as well, processing of the union restricting unit 103, the expansion unit 104, the determination restricting unit 105, and the character region candidate storing unit 106 may be performed in advance to extract character region candidates.

For example, in the embodiment, comics is taken as an example of the electronic book, although the present invention may be applicable to any electronic book that includes a character. For example, in a similar way to the embodiment, a character region can be extracted from, for example, a picture book and a magazine, in which a given space is provided around characters. As such, the present invention may be applicable to a picture book or a magazine, for example. Further, the present invention may be applicable to images other than the electronic book. For example, the character region determining unit 108 may determine a character region in image data obtained by scanning a paper sheet on which a character is drawn, for example, and then the processing performing unit 109 may perform predetermined processing. Further, for example, the character region determining unit 109 may determine a character region in image data such as materials, thesis paper, and leaflets on which characters and drawings are mixed. The processing according to the present is applicable to various images including a character.

The invention claimed is:

1. An image processing device comprising:
a storage unit configured to store image data; and
at least one processor configured to:
    obtain the image data stored in the storage unit;
    expand and unite a plurality of regions respectively indicating objects included in an image indicated by the image data;
    determine whether all or some of the regions, which are expanded and united, are character regions;
    perform predetermined processing on a region determined as a character region;
    expand an inside of the region that is determined as a character; and
    display the expanded inside of the region on a display on which the image is displayed.

2. The image processing device according to claim 1, wherein if a size of a contour of a region indicating an object included in the image or a size of the region itself is equal to or greater than a reference size, the at least one processor is configured to restrict the region from uniting with the region which is expanded.

3. The image processing device according to claim 2, wherein if the size of the contour of the region indicating the object included in the image or the size of the region itself is equal to or greater than the reference size, the at least one processor is configured to fill the region with a background color so as to restrict the region from uniting with the region which is expanded.

4. The image processing device according to claim 1, wherein the at least one processor is configured to restrict the region which was expanded from being determined whether the region is the character region if a size of a contour of the region or a size of the region itself is equal to or greater than the reference size.

5. The image processing device according to claim 4, wherein if the size of the contour of the region, which is expanded, or the size of the region itself is equal to or greater than the reference size, the at least one processor is configured to fill the region with the background color so as to restrict the region from being determined whether the region is the character region.

6. The image processing device according to claim 1, wherein the at least one processor is configured to:
    receive specifying operation of some of the regions which is expanded and united, and
    determine whether the some of the regions specified by the specifying operation are character regions.

7. An image processing method comprising:
obtaining image data stored in a storage unit which stores the image data;
expanding and uniting a plurality of regions respectively indicating objects included in an image indicated by the image data;
determining whether all or some of the regions, which are expanded and united, are character regions;
performing predetermined processing on a region that is determined as a character region;
expanding an inside of the region that is determined as a character; and
displaying the expanded inside of the region on a display on which the image is displayed.

8. A non-transitory computer-readable information storage medium for storing a program causing a computer to:
obtain image data stored in a storage unit which stores the image data;
expand and unite a plurality of regions respectively indicating objects included in an image indicated by the image data;
determine whether all or some of the regions, which are expanded and united, are character regions;
perform predetermined processing on a region that is determined as a character region;
expand an inside of the region that is determined as a character; and
display the expanded inside of the region on a display on which the image is displayed.

9. A non-transitory computer-readable information storage medium for storing a program causing a computer to:
obtain image data stored in a storage unit which stores the image data;
expand and unite a plurality of regions respectively indicating objects included in an image indicated by the image data;
determine whether all or some of the regions, which are expanded and united, are character regions;
perform predetermined processing on a region that is determined as a character region; and
if a size of a contour of a region indicating an object included in the image or a size of the region itself is equal to or greater than a reference size, restrict the region from uniting with the region which is expanded.

10. A non-transitory computer-readable information storage medium for storing a program causing a computer to:
obtain image data stored in a storage unit which stores the image data;
expand and unite a plurality of regions respectively indicating objects included in an image indicated by the image data;
determine whether all or some of the regions, which are expanded and united, are character regions;

perform predetermined processing on a region that is determined as a character region; and restrict the region which was expanded from being determined whether the region is the character region if a size of a contour of the region or a size of the region itself is equal to or greater than the reference size.

* * * * *